(12) United States Patent
Kano et al.

(10) Patent No.: US 8,078,356 B2
(45) Date of Patent: Dec. 13, 2011

(54) DRIVING ASSIST METHOD AND DRIVING ASSIST APPARATUS

(75) Inventors: Toshihiro Kano, Aichi (JP); Akihiro Nakajima, Nagoya (JP)

(73) Assignee: Aisin AW Co., Ltd., Anjo-shi, Aichi (JP)

(*) Notice: Subject to any disclaimer, the term of this patent is extended or adjusted under 35 U.S.C. 154(b) by 1238 days.

(21) Appl. No.: 11/802,439

(22) Filed: May 23, 2007

(65) Prior Publication Data

US 2007/0282501 A1 Dec. 6, 2007

(30) Foreign Application Priority Data

May 31, 2006 (JP) ................................. 2006-151345

(51) Int. Cl.
*G06F 7/00* (2006.01)

(52) U.S. Cl. ............ 701/36; 701/41; 701/300; 701/301; 382/195; 382/104

(58) Field of Classification Search .................. 701/36, 701/41, 207, 300–301; 345/4, 7, 9; 340/425.5; 348/131–132, 135, 143, 148, 153; 362/541, 362/543, 509; 382/199, 104, 195
See application file for complete search history.

(56) References Cited

U.S. PATENT DOCUMENTS

| | | | | |
|---|---|---|---|---|
| 4,931,937 A | * | 6/1990 | Kakinami et al. | 701/300 |
| 4,942,533 A | * | 7/1990 | Kakinami et al. | 701/225 |
| 4,970,653 A | * | 11/1990 | Kenue | 701/301 |
| 5,301,115 A | * | 4/1994 | Nouso | 701/300 |
| 5,307,419 A | * | 4/1994 | Tsujino et al. | 382/153 |
| 5,309,137 A | * | 5/1994 | Kajiwara | 340/436 |
| 5,341,437 A | * | 8/1994 | Nakayama | 382/104 |
| 5,961,571 A | * | 10/1999 | Gorr et al. | 701/207 |
| 5,987,174 A | * | 11/1999 | Nakamura et al. | 382/199 |
| 6,509,832 B1 | * | 1/2003 | Bauer et al. | 340/425.5 |
| 6,672,745 B1 | * | 1/2004 | Bauer et al. | 362/545 |
| 6,894,717 B2 | * | 5/2005 | Bakewell | 348/149 |
| 2002/0186297 A1 | * | 12/2002 | Bakewell | 348/118 |
| 2003/0214585 A1 | * | 11/2003 | Bakewell | 348/148 |

(Continued)

FOREIGN PATENT DOCUMENTS

EP  0361914  * 4/1990

(Continued)

OTHER PUBLICATIONS

Night-Time Traffic Surveillance: A Robust Framework for Multi-vehicle Detection, Classification and Tracking; Robert, K.; Advanced Video and Signal Based Surveillance, 2009. AVSS '09. Sixth IEEE International Conference on; Digital Object Identifier: 10.1109/AVSS.2009.98; Publication Year: 2009, pp. 1-6.*

(Continued)

*Primary Examiner* — Cuong H Nguyen
(74) *Attorney, Agent, or Firm* — Bacon & Thomas, PLLC (57) ABSTRACT

In a driving assist system for a vehicle, a camera driver controls an on-board rear camera to take an image of an area around a vehicle only when light-emitting diodes of the tail lights and brake lights are non-luminous, responsive to an image pickup timing signal output from a light control. An image processor executes panoramic view conversion of image data input from the camera driver, stores the converted data in an image memory, and displays a composite image by combining a plurality of sets of panoramic view data.

9 Claims, 6 Drawing Sheets

U.S. PATENT DOCUMENTS

2007/0282501 A1* 12/2007 Kano et al. .................. 701/41
2009/0202105 A1* 8/2009 Castro Abrantes et al. ... 382/100

FOREIGN PATENT DOCUMENTS

| GB | 2240443 | * | 7/1991 |
| JP | 2002-373327 | | 12/2002 |
| JP | 2005-178576 | | 7/2005 |

OTHER PUBLICATIONS

A hardware in the loop facility for testing multisensor sense and avoid systems; Forlenza, L.; Fasano, G.; Accardo, D.; Moccia, A.; Rispoli, A.; Digital Avionics Systems Conference, 2009. DASC '09. IEEE/AIAA 28th; Digital Object Identifier: 10.1109/DASC.2009.5347464; Publication Year: 2009, pp. 5.C.4-1-5.C.4-10.*

Visible light road-to-vehicle communication using high-speed camera; Iwasaki, S.; Premachandra, C.; Endo, T.; Fujii, T.; Tanimoto, M.; Kimura, Y.; Intelligent Vehicles Symposium, 2008 IEEE; Digital Object Identifier: 10.1109/IVS.2008.4621155 Publication Year: 2008, pp. 13-18.*

Terrain-based road vehicle localization on multi-lane highways; Dean, A.J.; Brennan, S.N.; American Control Conference, 2009. ACC '09; Digital Object Identifier: 10.1109/ACC.2009.5160078; Publication Year: 2009, pp. 707-712.*

Feature-aided localization and tracking of ground vehicles using passive acoustic sensor networks; Ravindra, V.C.; Bar-Shalom, Y.; Damarlay, T.; Computational Advances in Multi-Sensor Adaptive Processing (CAMSAP), 2009 3rd IEEE International Workshop on; Digital Object Identifier: 10.1109/CAMSAP.2009.5413291; Pub. Year: 2009, pp. 241-244.*

Vehicle Detection Based on Adaptive Background; Bao-xia Cui; Shang-min Sun; Yong Duan; Knowledge Discovery and Data Mining, 2009. WKDD 2009. Second International Workshop on; Digital Object Identifier: 10.1109/WKDD.2009.117 Publication Year: 2009, pp. 821-824.*

Detection of composite events spanning multiple camera views with wireless embedded smart cameras; Youlu Wang; Velipasalar, S.; Casares, M.; Distributed Smart Cameras, 2009. ICDSC 2009. Third ACM/IEEE International Conference on Digital Object Identifier: 10.1109/ICDSC.2009.5289355; Publication Year: 2009, pp. 1-8.*

Yadid-Pecht, Orly et al., "Image Sensors With Individual Pixel Reset," NASA Tech Briefs, Nov. 1996 (2 pages).*

Yadid-Pecht, Orly et al., "Readout Schemes to Increase Dynamic Ranges of Image Sensors," NASA Tech Briefs, Jan. 1997 (2 pages).*

Mendis, Sunetra K., "Low-Light-Level Image Sensor With On-Chip Signal Processing," SPIE, vol. 1952, pp. 23-33.*

\* cited by examiner

DRIVING ASSIST METHOD AND DRIVING ASSIST APPARATUS

INCORPORATION BY REFERENCE

The disclosure of Japanese Patent Application No. 2006-151345 filed on May 31, 2006 including the specification, drawings and abstract is incorporated herein by reference in its entirety.

BACKGROUND OF THE INVENTION

1. Field of the Invention

The present invention relates to a driving assist method and a driving assist apparatus.

2. Description of the Related Art

A vehicle-mounted apparatus that displays images taken by an on-board camera is known. This apparatus receives picture signals from the on-board camera mounted at the rear end of the vehicle, and outputs, to a display arranged near the driver's seat, background images based on the picture signals.

In addition, in Japanese Patent Application Publication No. JP-A-2002-373327, there is proposed an image processing apparatus that stores image data input from an on-board camera, performs image processing using the stored image data and displays an image of a panoramic view overlooking the area around the vehicle.

When the vehicle is moving backward, the road surface or obstacles around the vehicle can be illuminated red by the light from tail lights or brake lights. For example, because brake lights are used only occasionally, the image data captured when the brake lights are on differs from the image data captured when they are not on, resulting in data of different hues and brightness levels, even for the same road. Therefore, if image processing is performed on the image data taken under different conditions of illumination and the resultant composite data is output to the display, the composite image of the road surface around the vehicle will be displayed totally or partially red, or as a spotty composite image which has areas of different brightness. Therefore, not only is it impossible to display images of good quality, but there is also the possibility that the image will cause the driver to misunderstand the road markings.

SUMMARY OF THE INVENTION

In view of the above-mentioned problems, an object of the present invention is to provide a driving assist method and a driving assist apparatus that can display driving assist images of good quality.

According to a first aspect of the present invention, image data, which is obtained only when a vehicle light device is off, is used for the driving assist image. Thus, a driving assist image of poor quality due to partial reddening by illumination with the vehicle lights is prevented and a driving assist image of good quality is displayed.

According to the second aspect of the invention, when the vehicle light device is off, image taking by the image-taking device is at a constant (predetermined) interval of time or travel distance of the vehicle. For this reason, the image-taking device can be controlled in accordance with the state of the vehicle light device.

According to a third aspect of the invention, the image-taking controller acquires, from the image-taking device mounted at the rear end of the vehicle, the image data taken when vehicle light device is off, enabling a driving assist image of good quality showing the vehicle's rear view to be displayed while the vehicle is moving in reverse.

According to the fourth aspect of the invention, the driving assist apparatus provides image recognition by using a plurality of sets of image data, each set taken under different conditions of illumination by vehicle light devices mounted at different locations on the vehicle, whereby the objects around the vehicle are illuminated differently better enabling the shapes of the objects to be visually recognized in more detail.

DETAILED DESCRIPTION OF THE PREFERRED EMBODIMENT

One embodiment of the driving assist apparatus of the present invention is described below referring to FIG. 1 to FIG. 7.

Figure 1:
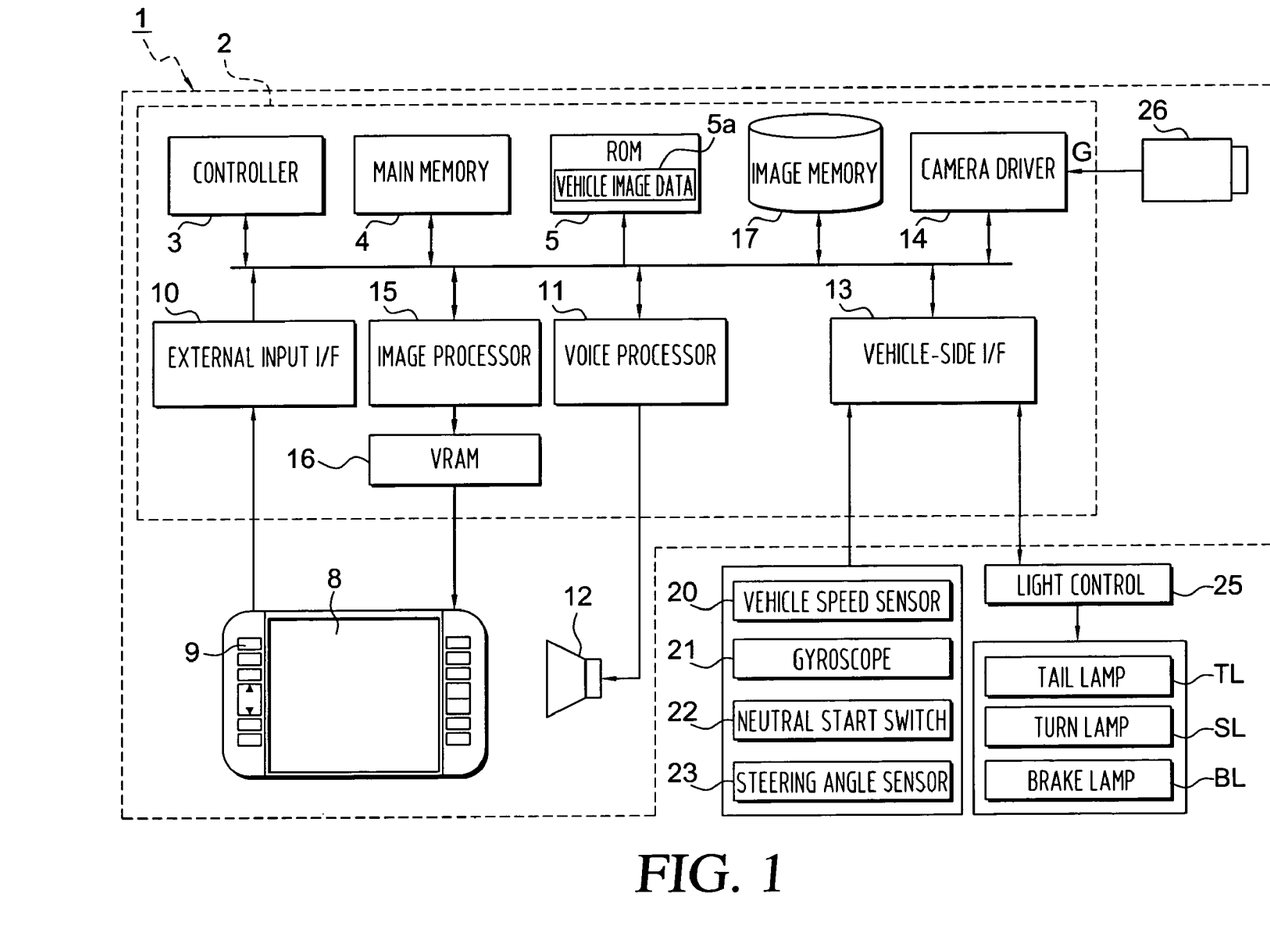
FIG. 1 is a block diagram of one embodiment of a driving assist apparatus in accordance with the present invention.
Figure 2:
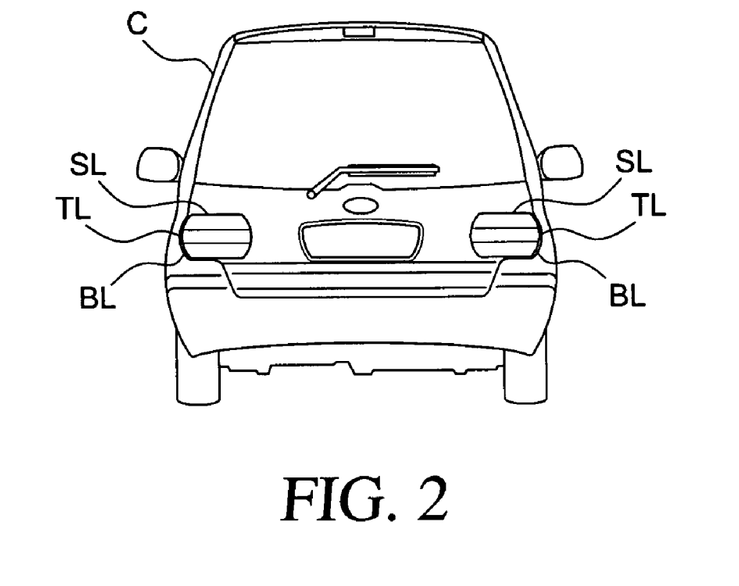
FIG. 2 is a rear elevational view of a vehicle showing of locations of tail lights and brake lights.

As shown in FIG. 1, a driving assist system 1 is provided with a control unit 2 as a driving assist apparatus. The control unit 2 has combined light device controller and image taking controller 3, a main memory 4, and a ROM 5. The controller 3 executes various control routines utilizing various programs, including a driving assist program, stored in the ROM 5. The main memory 4 stores various variables, flags, and so forth for driving assist purposes, as well as temporarily storing results of calculation by the controller 3.

The ROM 5 stores vehicle image data 5a as well as various programs. The vehicle image data 5a is the data to be output to a display 8 device on which an image of the vehicle (see FIG. 2) is displayed in implementation of the driving assist system 1.

The display device 8 has a touch panel, and when an input operation is executed using this touch panel, a signal indicative of that input is output to the controller 3 via an external input interface (hereinafter called "external input I/F 10") provided in the control unit 2. In addition, when an operating switch 9 provided adjacent the display device 8, receives an input by the user, a signal indicative of that input is output to the controller 3, also via the external input I/F 10.

The control unit 2 also includes a voice processor 11. The voice processor 11 is provided with a memory (not shown), storing voice files, a digital-analog converter, and so forth, and, by using the voice files, outputs guidance by voice and warning sounds from a speaker 12 provided in the driving assist system 1.

Furthermore, the control unit 2 is provided with a vehicle-side interface (hereinafter called "vehicle-side I/F 13"). Via this vehicle-side I/F 13, the controller 3 receives vehicle speed pulses from a vehicle speed sensor 20 installed in vehicle C, and counts the number of pulses. In addition, the controller 3 receives a direction detection signal from a gyroscope 21 via the vehicle-side I/F 13, and updates the current direction, which is one of the variables stored in the main memory 4.

The controller 3 also receives a shift position signal from a neutral start switch 22 in the vehicle C, via the vehicle-side I/F 13, and updates the shift position, which is another of the variables stored in the main memory 4. Further, the controller 3 receives a steering angle signal from a steering angle sensor 23 via the vehicle-side I/F 13.

The controller 3, responsive to receipt as input a shift position signal that indicates reverse, sets the location of the vehicle at that moment as the reference location from which the vehicle reverse motion started. Based on the reference position, the vehicle speed pulse, and the steering angle signal, the controller 3 calculates relative coordinates from the reference position and a relative steering angle.

In addition, the controller 3 is connected to a light (lamp) control 25 of the vehicle C via the vehicle-side I/F 13. The light control 25 turns on and off the vehicle light devices shown in FIG. 3, including tail lights TL and brake lights BL, and also flashes turn lights SL as direction indicator lights. The tail lights TL are turned ON at darkness, e.g. night, and emit red light when turned ON. The brake lights BL are turned ON when the brake pedal is depressed, and also emit red light. The turn light SL is flashed at a predetermined interval responsive to the driver's operation of a lever to signal making a turn.

The tail lights TL and the brake lights BL have light-emitting diodes as illuminators. The light control 25 generates an on/off signal to turn off and on the tail lights TL and brake lights BL, and, based on the on/off signal, makes the light-emitting diodes of the tail lights TL and the brake lights BL switch between lighted and non-lighted states at a predetermined frequency (for example, at more than 60 Hz or with a constant period less than 16 milliseconds) which human eyes cannot recognize visually. For this reason, the tail lights TL and the brake lights BL appear to be continuously "ON" to pedestrians and drivers of other vehicles.

Figure 6A:
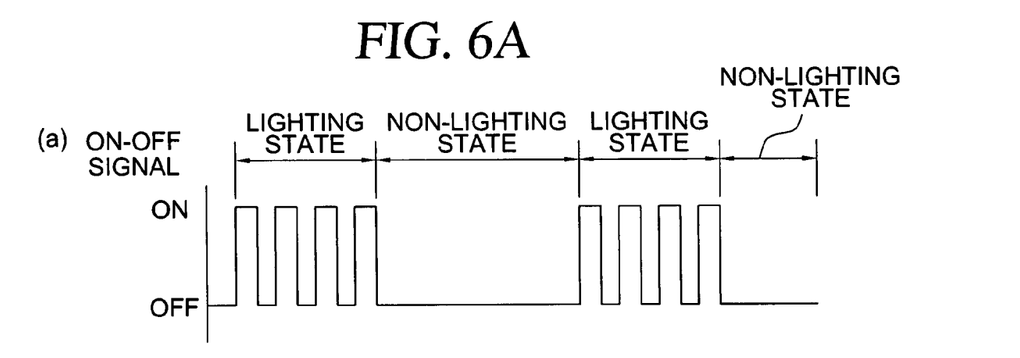
FIG. 6A is a time chart a signal alternating between on and off with time.

For example, the light control 25, when it has received a brake signal from a brake sensor (not shown), generates an on/off signal as shown in FIG. 6A, and, based on the on/off signal, switches the light-emitting diodes of the brake lights BL between lighted and non-lighted states at a high frequency. Because the frequency in this case is beyond the range where it is detectable by the human eyes, the brake lights BL appear to be continuously lighted to pedestrians and drivers of other vehicles. When no brake signal is input from the brake sensor, the light-emitting diodes of the brake lights BL remain continuously non-luminous, i.e. in the non-lighted state. Similarly, to have the tail lights TL "ON", the light control 25 continuously outputs the on/off signal to the tail lights TL.

In addition, the light control 25 outputs an image pickup timing signal to a camera driver 14 via the vehicle-side I/F 13. Specifically, the light control 25 outputs the image pickup timing signal shown in FIG. 6B to the controller 3 in the brief time intervals when the on/off signal is off while repeatedly switching between the luminous and non-luminous states of the light-emitting diodes of the tail lights TL and the brake lights BL.

Figure 6B:
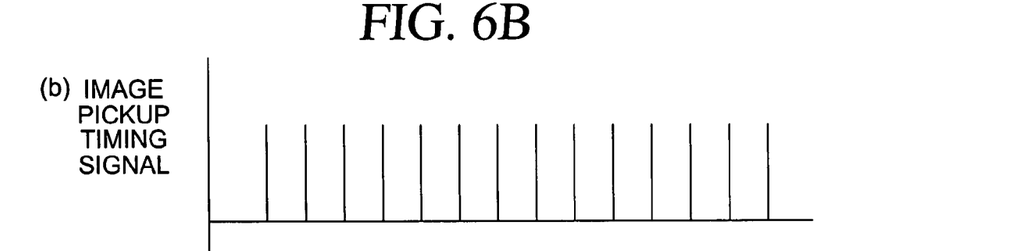
FIG. 6B is a time chart of an image pickup timing signal.

In addition, the light control 25, when the tail lights TL and the brake lights BL are not "ON", outputs an image pickup timing signal that has the same period as the image pickup timing signal of FIG. 6B and that does not depend on the phase of the on/off signal.

Figure 3:
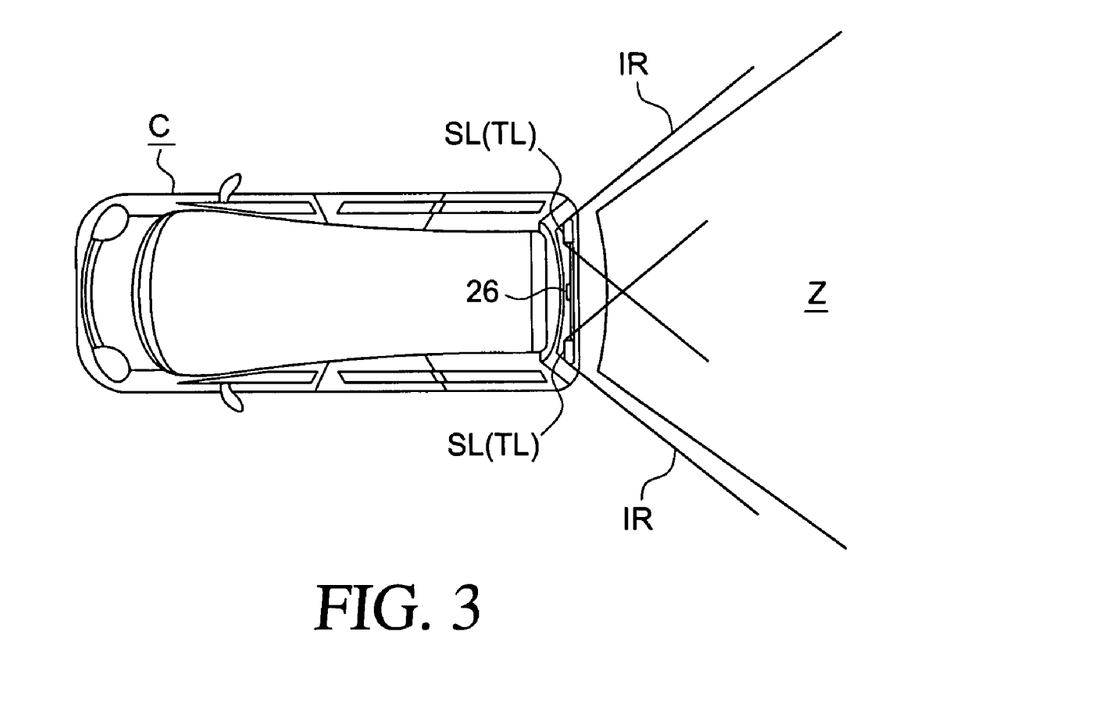
FIG. 3 is a top plan view of a vehicle showing location of a rear camera.

In addition, the camera driver 14 ("image taking controller"), in response to the image pickup timing signal input, controls drives a rear camera 26 ("image-taking device") mounted on the rear end of the vehicle C as shown in FIG. 3. The rear camera 26 is provided with an optical system composed of a wide-angle lens, mirror and so forth, and with a CCD image sensor, and is mounted at a location such as on the back door with its optical axis obliquely downward. The camera driver 14, in response to the image pickup timing signal, generates a driving signal to drive the CCD image sensor and a driving signal to drive an electronic shutter, and outputs those signals to the rear camera 26.

In other words, as shown in FIG. 3, this rear camera 26 sets a range within several meters rearward from the vehicle C as an image-taking range Z, and this image-taking range Z overlaps the irradiation range IR of the tail lights TL. Therefore, if the rear camera 26 were to be driven while the tail lights TL and brake lights BL are in their lighted state, a picture would be taken of the road surface and obstacles illuminated with red lightly the tail lights TL and the brake lights BL. Thus, in each brief period while the tail lights TL and brake lights BL are in their non-lighted (non-luminous) state, the camera driver 14 takes a picture by driving the electronic shutter of the rear camera 26 to obtain one set of image data G. The rear camera 26 also performs analog-digital conversion for the CCD output signal from the CCD image sensor, and outputs digitized image data G to the camera driver 14.

An image processor 15 ("output controller") receives the image data G from the camera driver 14, and applies coordinate conversion to the image data G to generate panoramic view data G1 as if overlooking the image-taking range Z from directly overhead. Furthermore, associating the current position relative to the reference position and the steering angle, it stores that data in association with the panoramic view data G1 in an image memory 17 ("image data storage").

The image processor 15, when a predetermined number of sets of the panoramic view data G1 have been accumulated in the image memory 17, by continuously combining a part of each set of the panoramic view data G1 and the most recent image data G (hereinafter called "current image data G2"), forms composite data G3 and stores it in a VRAM 16. Then it outputs the composite data G3, as well as reference marks such as vehicle image data 5a, to the display 8.

Figure 4:
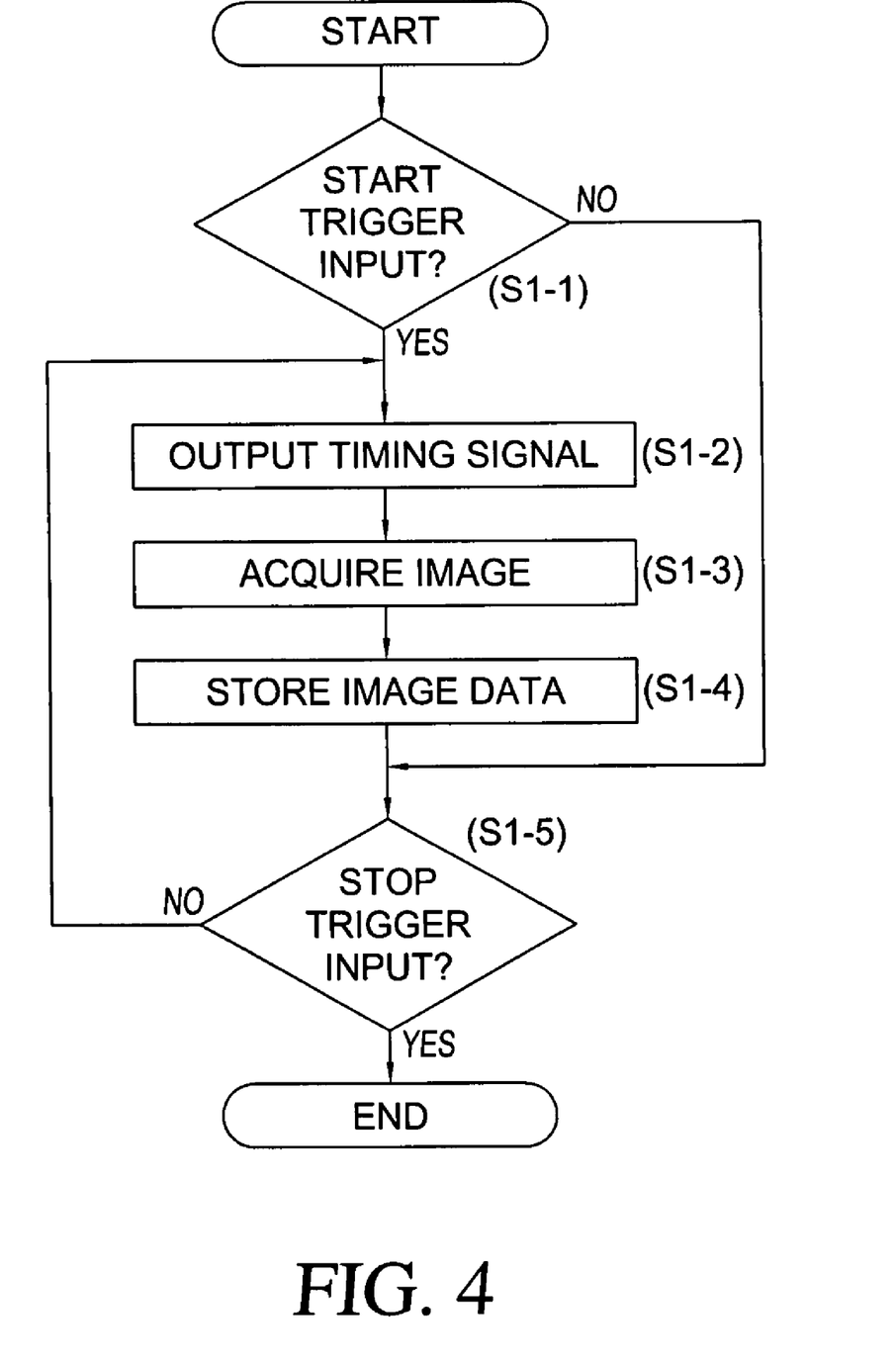
FIG. 4 is a flow chart of an image data accumulation subroutine.
Figure 5:
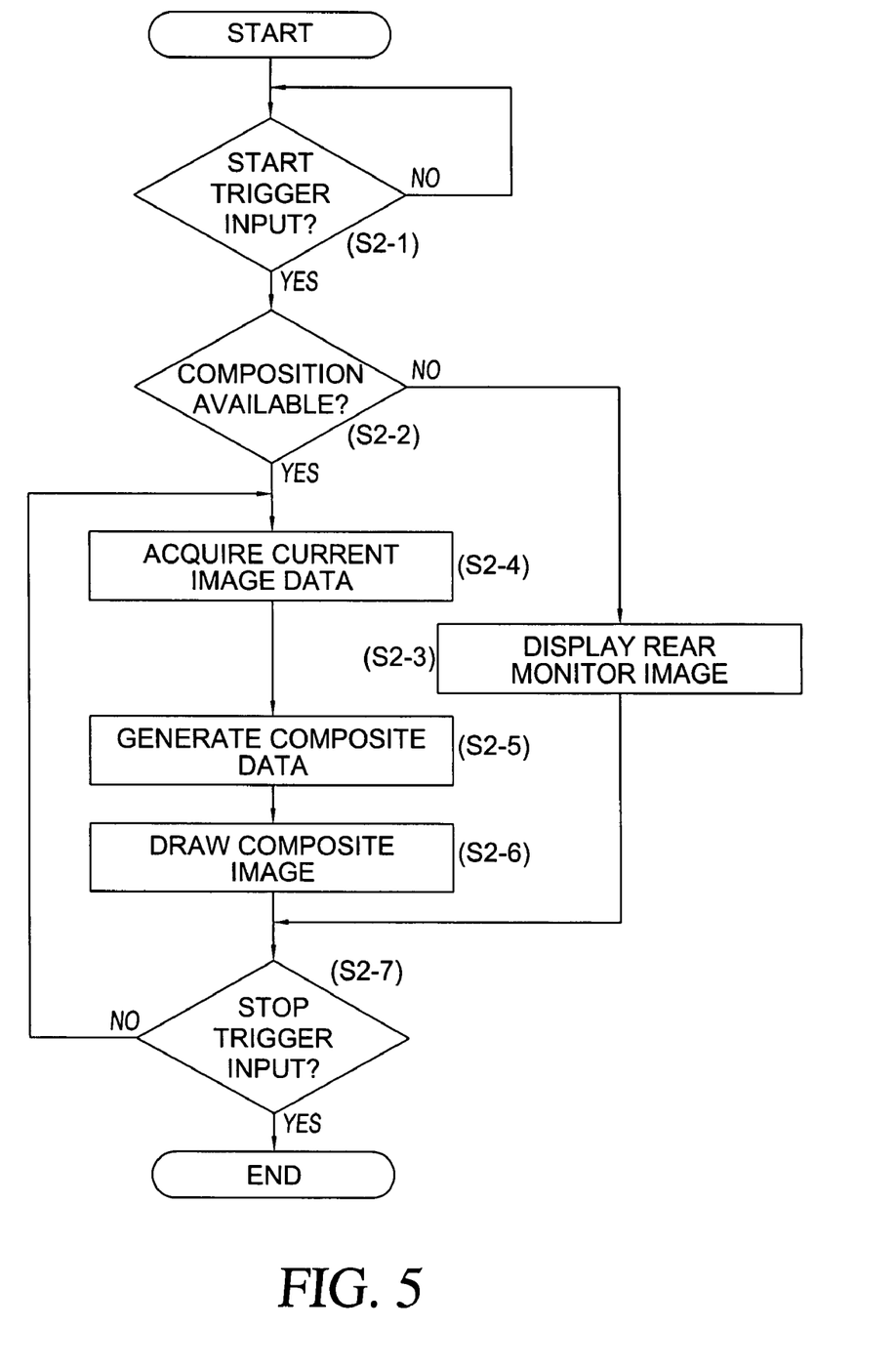
FIG. 5 is a flow chart of an image composition subroutine.

Next, the method of operation of the foregoing embodiment will be described referring to FIG. 4 and FIG. 5. In the image data accumulation processing shown in FIG. 4, the controller 3 waits for the input of a start trigger to initiate the driving assist routine (step S1-1). The start trigger is, in this embodiment, a signal from the start switch 22 indicating that the vehicle is in reverse, and, when this start trigger is input (YES in step S1-1), the then current position of the vehicle C is set as a reference position as described above. In addition, the light control 25 outputs the image pickup timing signal to synchronize the operation of the rear camera 26 with that of the tail lights TL and the brake lights BL (step S1-2).

The camera driver 14 executes image acquisition based on this image pickup timing signal (step S1-3). In other words, as shown in FIG. 6, the camera driver 14, when the tail lights TL and brake lights BL are "ON", takes images when the light-emitting diodes are in their non-luminous state during the high frequency switching between the high luminous and non-luminous states, and acquires the image data G from the rear camera 26.

The camera driver 14, when it receives the image data G, outputs it to the image processor 15. The image processor 15, by conventional coordinate conversion, generates the panoramic view data G1, simulating a view from overhead the image-taking range Z of the rear camera 26. The controller 3 stores, in the image memory 17, the panoramic view data G1, in association with the current position relative to the reference position and the current steering angle (step S1-4).

Then the controller 3 judges whether or not a stop trigger is input (step S1-5). In this embodiment, the stop trigger is an input of a signal indicative of a shift position other than reverse. If a stop trigger is not input (NO in step S1-5), the routine returns to step S1-2 and the steps described above are repeated.

Next, the image composition subroutine will be described with reference to FIG. 5. This image composition subroutine is executed in parallel with the image data accumulation subroutine shown in FIG. 4. The controller 3 waits for the input of a start trigger (step S2-1), as in the image data accumulation subroutine. After judging that a start trigger is input (YES in step S2-1), the image processor 15 then judges whether or not a composite image can be formed (step S2-2). At this time, the image processor 15 acquires the current position (coordinates relative to the reference position) of the vehicle C, and judges whether or not sufficient sets ("sheets") of the panoramic view data G1 corresponding to the current area around the rear of the vehicle C are stored.

If sufficient sets of the panoramic view data G1 have not been accumulated, the judgment is that a composite image cannot be formed (NO in step S2-2), and the image processor 15 displays a rear monitor image on the display 8 (step S2-3). Specifically, the image processor 15 outputs an image acquisition signal to the camera driver 14 and the camera driver 14, when it receives the image acquisition signal, based on the image pickup timing signal that is output from the light control 25 independent of the phase of the on/off signal, captures images by driving the rear camera 26. The camera driver 14 outputs the image data G acquired from the rear camera 26 to the image processor 15, and the image processor 15, after temporarily storing the image data G in the VRAM 16, displays on the display 8 the rear monitor image based on the image data G and guide lines such as a vehicle width extension line and a predicted path locus based on the steering angle. Therefore, the rear monitor image becomes an image for the vicinity around the vehicle which is illuminated by the tail lights TL and the brake lights BL, and thus nearly replicates the background that the driver would actually see. For this reason, if a composite image using the panoramic view data G1 is not displayed during movement of the vehicle C in reverse, a flicker-free image can be displayed.

On the other hand, when judging that a composite image can be formed (YES in step S2-2), the image processor 15 acquires current image data G2 form the camera driver 14 (step S2-4). At this time, the camera driver 14, during those short intervals in the high frequency switching when the light-emitting diodes of the tail lights TL and the brake lights BL are non-luminous, takes images by controlling the rear camera 26.

Figure 7:
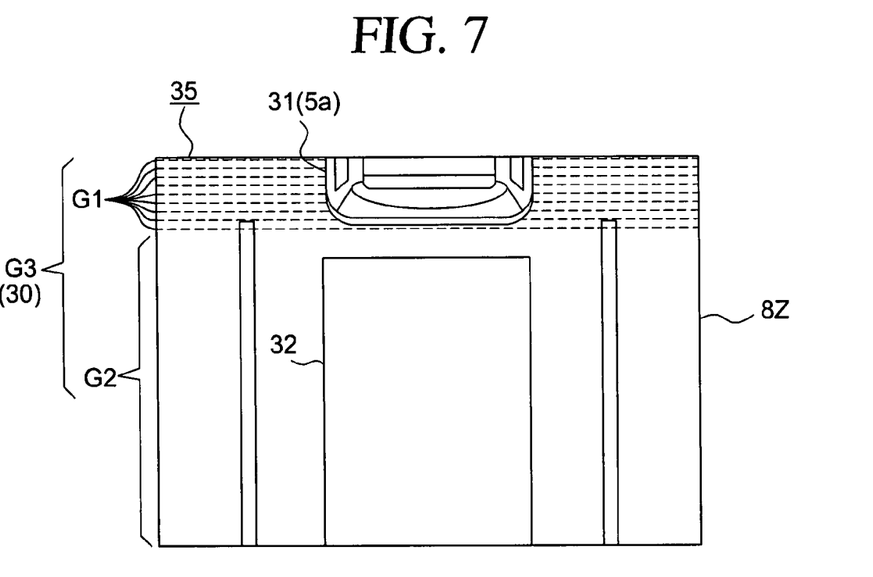
FIG. 7 is an explanatory illustration of formation of a driving assist image.

Having acquired the current image data G2, the image processor 15 forms the composite data G3 (step S2-5). Specifically, it extracts a part of each of the sets of panoramic view data G1, stored in the image memory 17, corresponding to the current area around the rear of the vehicle C. In addition, as shown in FIG. 7, the processor 15 merges the extracted data in a direction almost parallel to the reverse motion of the vehicle C so that the images become continuous, and arranges the image formed from the merged extracted data so that it is displayed in the upper part of a display area 8Z of the display 8. In addition, the processor 15 applies a panoramic conversion to the current image data G2 to obtain sets of panoramic view data G1, and continuously combines each set with the extracted data to obtain composite data based on the current image data G2, that is displayed in the lower part of the display area 8Z. Then the processor temporarily stores in the VRAM 16 the composite data G3 consisting of each of the sets of panoramic view data G1 and the current image data G2.

Having formed the composite data G3, the image processor 15 uses the composite image on the display 8 (step S2-6). At this time, the image processor 15, as shown in FIG. 7, superimposes a vehicle image 31, based on the vehicle image data 5a, at a predetermined position above the composite image 30, as a driving assist image based on the composite data G3. Furthermore, it draws, as guide lines 32, width extension lines representing the width of the vehicle C. As a result, an auxiliary image 35 as shown in FIG. 7 is displayed on the display 8. At this time, the continuously displayed panoramic view data G1 corresponds to the area currently around the rear of the vehicle C. In addition, because the image data G which is used is from images captured when the light-emitting diodes of the tail lights TL and the brake lights BL are non-luminous, the illumination condition becomes constant for all image data G, and image poor quality such as partial reddening does not occur. The vehicle driver visually recognizes this auxiliary image 35 and recognizes the relative position between a target parking area and the vehicle C. The driving assist system 1 repeats the processing described above until the parking operation is completed.

When the parking operation is completed and a signal representing a shift position other than reverse is input from the neutral start switch 22, the controller 3 judges that a stop trigger is input (YES in step S1-5 and step S2-7), and terminates the routine.

Accordingly, above embodiment offers the following advantages.

(1) In the above embodiment, the camera driver 14, based on the image pickup timing signal output by the light control 25, captures an image of the area to the rear of the vehicle C when the light-emitting diodes of the tail lights TL and the brake lights BL are non-luminous. In addition, the generated image data G is converted to the panoramic view data G1 in the image memory 17, and the panoramic view data G1 is used in the composite image 30. Furthermore, the current image data G2 used in the composite image 30 is also taken when the light-emitting diodes are non-luminous, based on the image pickup timing signal. Consequently, the composite image 30 does not become partly red or uneven in brightness due to illumination by the tail lights TL and/or the brake lights BL. Moreover, because the road surface around the vehicle does not become red, good image quality is achieved.

(2) In the above embodiment, the light control 25 makes the light-emitting diodes of the tail lights TL and the brake lights BL turn on and off at a frequency at which human eyes cannot detect. Therefore, even though it repeatedly switches the light-emitting diodes between lighted and non-lighted states to acquire the image data G, misunderstanding by nearby pedestrians and drivers of other vehicles is avoided.

(3) In the above embodiment, the control unit 2 uses the image data G, which is input from the rear camera 26 mounted at the rear end of the vehicle C, for image composition processing. Thus, a composite image 30 of good quality can be displayed during a parking operation.

(4) In the above embodiment, the light control 25 outputs the image pickup timing signal, which is independent of the phase of the on/off signal, when the tail lights TL and the brake lights BL are non-luminous. Thus, acquisition of the image data G is dependent on the state of the tail lights TL and the brake lights BL.

Possible modifications of the above embodiment include the following.

In the above embodiment, the light control 25 generates the on/off signal and controls the tail lights TL and the brake lights BL; however, it is also possible that the control unit 2 (for example, the controller 3 or the image processor 15) could be used to generate the on/off signal and to drive the tail lights TL and the brake lights BL. In this case, the control unit 2 (for example, the controller 3 or the image processor 15) also outputs the image pickup timing signal.

In the above embodiment, the camera driver 14 captures images based on the image pickup timing signal that is independent of the phase of the on/off signal when the tail lights TL and the brake lights BL are non-luminous. Instead, image capture may be performed by driving the rear camera 26 every time the vehicle C moves backward by a predetermined distance, according to the main routine executed by the controller 3.

The image processor 15, after coordinate conversion of the image data G to obtain the panoramic view data G1, stores it in the image memory 17; however, the image data G may be stored in the image memory 17 without coordinate conversion, and the coordinate conversion may be later at the time of forming the composite image.

In the above embodiment, the composite image is obtained by continuously combining each set of the panoramic view data G1 and the current image data G2; however, the composite may be obtained by another method.

In the above embodiment, the image taking is synchronized with operation of the tail lights TL and the brake lights BL; however, it may be synchronized with operation of the turn signal light SL. In this case, the turn signal light SL is flashed by the light control 25 with a frequency which can be recognized by the human eyes, and the camera driver 14 captures images when the light-emitting diodes of the turn signal light SL are non-luminous during the flashing. In this way also, a composite image 30 of good image quality can be displayed.

Figure 8:
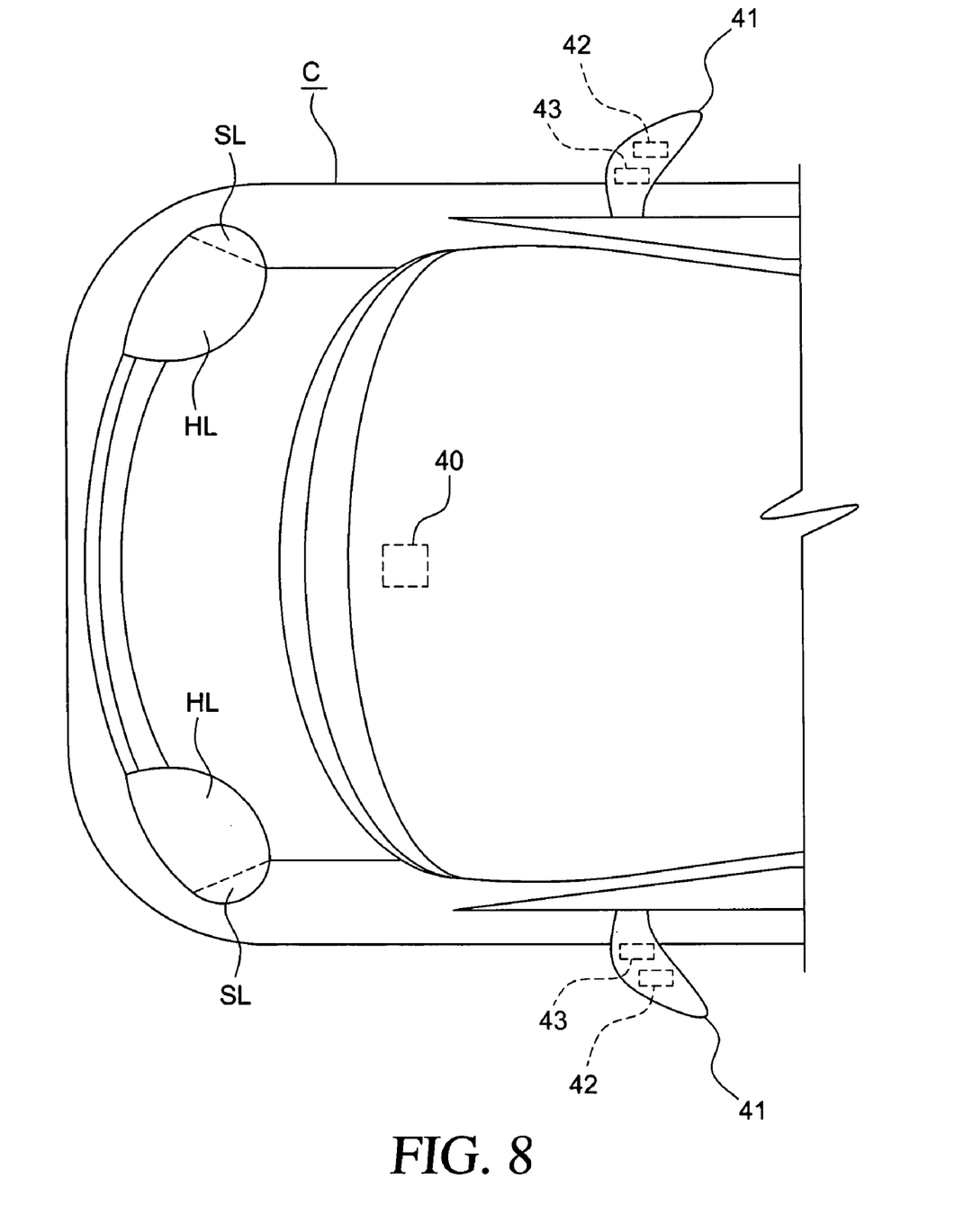
FIG. 8 is a partial plan view of a vehicle employed in another example.

Operation of the camera may be timed with that of operation of light-emitting diodes other than the lights mentioned in the above embodiment. For example, as shown in FIG. 8, the image processor (vehicle recognition device) executes image recognition for images obtained using a forward-monitoring camera 40 (image-taking device) mounted at the front part of the vehicle C, and image capture by the forward-monitoring camera 40 occurs when the light-emitting diodes of headlights HL and front turn signal lights SL are non-luminous. In addition, when image composition or image recognition is performed using images from a blind corner camera 42 installed in a side mirror 41 of the vehicle C, if a turn signal light or a light 43 such as a supplemental light for photographing is installed in a side mirror 41, the blind corner camera 42 may be exposed to light when the light-emitting diode of the light 43 is non-luminous.

The controller 3 may control so that right and left lights such as the tail lights TL provide different amounts of light at the same time by, for example, flashing alternately the right and left tail lights TL of the vehicle C. For example, when the left tail light TL is luminous, a picture is taken by the rear camera 26, whereby the first image data G is generated. When the right tail light TL is luminous, a picture is taken by the rear camera 26, whereby the second image data G is generated. Then, applying a conventional edge extraction process to the first image data G and the second image data G, image recognition of objects around the vehicle may be performed. In this case, because the first image data G and the second image data G are taken under illumination conditions different from each other, the detected edges are also different from each other. By integrating these detected edges, the shape of the object is distinguished in detail. Therefore, in this manner, by photographing the area around the vehicle under different illumination conditions and generating multiple sets of image data, and then integrating the result of image processing of each set of image data, shapes of objects around the vehicle and/or of the road can be recognized more exactly and in more detail.

What is claimed is:

1. A driving assist method using an image-taking device mounted on a vehicle and displaying a driving assist image on a display device, the method comprising:
    switching a vehicle light device between luminous and non-luminous periods at a predetermined frequency whereby a human eye perceives the vehicle lighting device as ON;
    taking an image of an area in the vicinity of the vehicle with the image-taking device in a non-luminous period of the vehicle lighting device;
    forming composite data by combining portions of a plurality of sets of image data generated by the image taking, each set representing an image captured during one non-luminous period; and
    displaying a driving assist image, based on the composite data, on the display device.

2. A driving assist apparatus which acquires a plurality of sets of image data from an image-taking device mounted on a vehicle having a vehicle lighting device, stores each set of the image data in an image data storage device, combines portions of the plurality of sets of image data to form a driving assist image, and outputs the driving assist image to a display device, the apparatus comprising:
    a light control for repeatedly switching the vehicle lighting device between luminous and non-luminous periods at a frequency whereby a human eye sees the vehicle lighting device as ON;
    an image-taking controller controlling the image-taking device to capture an image of the vicinity around the vehicle only in a non-luminous period of the vehicle lighting device, and acquiring a set of image data from the image-taking device for each image captured, for storage in the image data storage device; and
    an output controller forming composite data by using the plurality of sets of image data stored in the image data storage, and displaying the driving assist image, based on the composite data, on the display device.

3. The driving assist apparatus according to claim 2, wherein the image-taking controller, when the vehicle light device is in a non-luminous state, controls the image-taking device to capture images at a constant interval of time or predetermined travel distance of the vehicle.

4. The driving assist apparatus according to claim 3, wherein the vehicle lighting device is at least one of tail, brake, and direction indicator lights and the image-taking device is mounted on a rear end of the vehicle to take an image.

5. The driving assist apparatus according to claim 2, wherein the vehicle lighting device is at least one of tail, brake, and direction indicator lights and the image-taking device is mounted on a rear end of the vehicle to take an image.

6. The driving assist method of claim 2 further comprising superimposing an image of a vehicle on the driving assist image.

7. The driving assist apparatus according to claim 2 wherein the output controller makes a judgement whether or not a composite image can be formed based on the image data stored in the image data storage device, when the judgement is that a composite image can be formed, displays on the display device the driving assist image based on the composite data and, when the judgement is that a composite image cannot be formed, captures images by driving the image-taking device independent of the luminous and non-luminous periods and displays the captured images on the display device as the driving assist image.

8. The driving assist apparatus according to claim 2 wherein the output controller superimposes a vehicle image on the driving assist image.

9. The driving assist method according to claim 1 further comprising:

storing the plurality of sets of image data for the images taken by the image-taking device in an image memory;

judging whether or not a composite image can be formed based on the image data stored in the image memory;

when judging that a composite image can be formed, forming the composite image and displaying the driving assist image, based on the composite image, on the displaying device; and when judging that a composite image cannot be formed, taking the image by controlling the image-taking device independently of the luminous and non-luminous periods, displaying a driving assist image based on the image taken by the image-taking device.

* * * * *